United States Patent

[11] 3,574,475

[72] Inventor  George D. Wolff
               22565 Statler Blvd., St. Clair Shores, Mich.
               48079
[21] Appl. No. 750,508
[22] Filed     Aug. 6, 1968
[45] Patented  Apr. 13, 1971
               Continuation-in-part of application Ser. No.
               536,400, Mar. 22, 1966, now Patent No.
               3,395,718.

[54] SPEED AND TEMPERATURE SENSING DEVICES
     16 Claims, 5 Drawing Figs.
[52] U.S. Cl. .................................................. 415/17,
     60/39.28, 73/506, 123/103, 137/81.5, 236/79,
                                                          415/43
[51] Int. Cl. ...................................... G01p 3/72,
                                                 F02f 31/00
[50] Field of Search .......................................... 415/43, 17,
     29, 30; 60/105, 39.28; 236/79; 123/103; 137/81.5

[56]              References Cited
              UNITED STATES PATENTS
3,302,398  2/1967  Taplin et al. ................. 60/39.28
3,393,692  7/1968  Geary ........................... 415/29
3,461,892  8/1969  Boothe et al. .................. 415/29

FOREIGN PATENTS
285,503  10/1928  Great Britain ................  415/29

Primary Examiner—William E. Wayner
Attorney—John G. Batchelder

ABSTRACT: Speed and temperature-sensing devices for generating a pressure signal in response to vibrations in one or more operating conditions of a variable speed device, such as the speed of the device or the temperature of a selected region variable with or controlled by the speed of the device. Pressure pulses of gaseous fluid are periodically transmitted through a delay conduit to a cyclically operable pulse-dividing means which divides the arriving pulses between a pair of outlet conduits in proportions determined by the relationship between the phase of the divider within its operating cycle and the time of arrival of the pulse. Pulses are transmitted from a pulse-generating means to the dividing means through a conduit of a length such that a finite period of time is required for the pulse to reach the pulse-dividing means. The dividing means and the generating means operate at a cyclic relationship to each other and the length of the delay conduit is fixed. Variation in the proportion of the pulses between the outlet conduits is achieved either by varying the velocity of the pulse through the delay conduit or by changing the phase relation between the generating and dividing means, or both.

INVENTOR.
GEORGE D. WOLFF
BY
SETTLE, BATCHELDER & OLTMAN.
ATT'YS.

SPEED AND TEMPERATURE SENSING DEVICES

REFERENCE TO RELATED APPLICATIONS

This application is a continuation-in-part of my copending application, Ser. No. 536,400, filed Mar. 22, 1966, now U.S. Pat. No. 3,395,718 and, in certain of its aspects, is directed to subject matter closely related to that of my copending application, Ser. No. 750,509, filed concurrently herewith.

BACKGROUND OF THE INVENTION

The present invention, in one sense, may be said to be directed to further refinements to the systems disclosed in aforementioned U.S. Pat. No. 3,395,718. In the systems disclosed in my U.S. Pat. No. 3,395,718, the pressure pulse-generating mechanism and the pulse-dividing means both took the form of mechanical elements operable to generate and divide pressure pulses in a liquid operating medium, such as oil. In one form, the present invention discloses how such a system may be modified to retain its speed-sensing function and, at the same time, to incorporate a temperature-responsive signal which controls the speed of the variable speed device in accordance with variations in temperature. This is accomplished by substituting a gaseous operating fluid for the oil employed in the prior application and, in transmitting the pressure pulses from the generator to the divider, exposing the pulses to the temperature within a selected region whose temperature is to be monitored and controlled by controlling the speed of the variable speed device. The velocity of the pressure pulses through a gaseous fluid varies with the square root of the absolute temperature, thus enabling a varying of the phase relationship between the divider and time of arrival of the pulse in accordance with temperature.

In other forms of the invention, the mechanical elements of the speed-sensing system of my U.S. Pat. No. 3,395,718 are replaced by fluidic elements.

Various objects, advantages and features of the present invention will become apparent by reference to the following specification and to the drawings.

IN THE DRAWINGS

Figure 2:
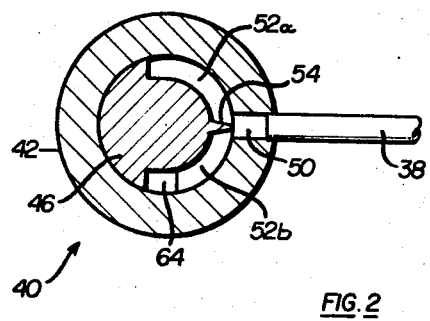
FIG. 2 is a detail cross-sectional view taken on line 2-2 of FIG. 1.
Figure 1:
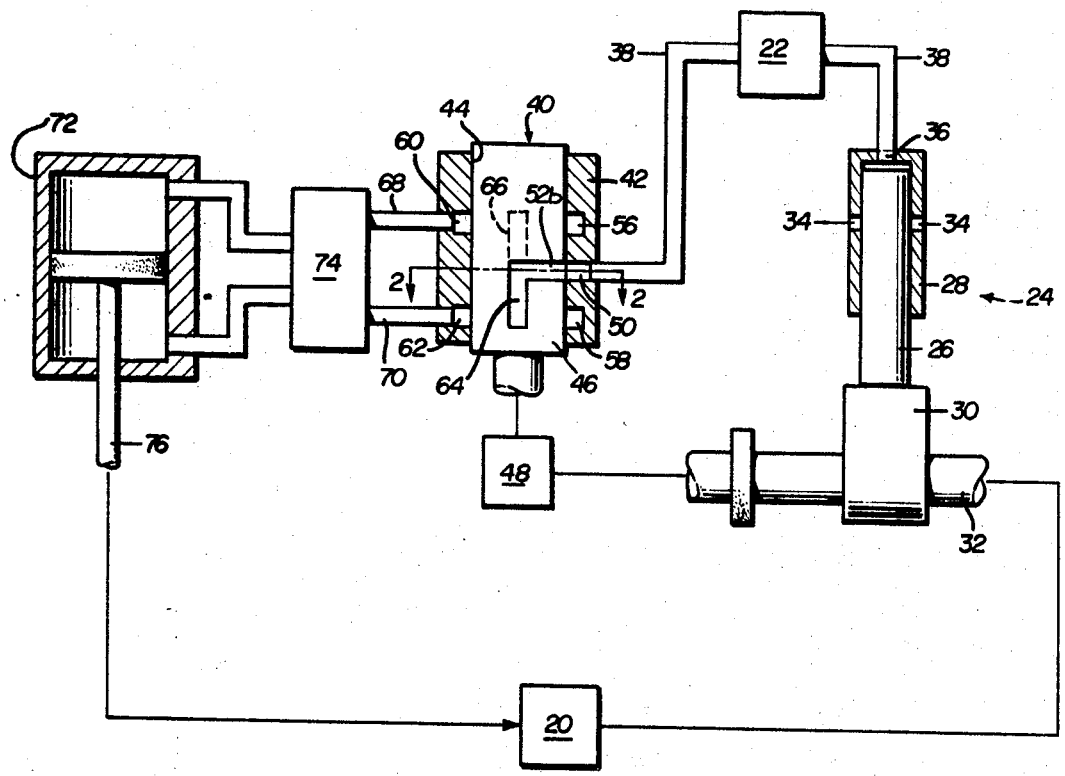
FIG. 1 is a schematic diagram, partially in cross section, of one form of system embodying the present invention.

Referring first to FIGS. 1 and 2, there is disclosed a system for controlling the speed of a variable speed device in response to variations in temperature. The variable speed device, schematically illustrated at 20 may, for example, be the drive motor of a fan or blower whose speed is to be controlled in accordance with the temperature existing within an enclosed space or chamber schematically illustrated at 22. The control system of FIGS. 1 and 2 incorporates the basic principal of operation of the speed-sensing system disclosed in my U.S. Pat. No. 3,395,718 and employs basically the same pulse-generating and dividing mechanisms disclosed in that patent, which mechanisms have been modified to some extend to add to the original system a temperature-responsive control signal.

In my U.S. Pat. No. 3,395,718 the control system employed has an operating fluid preferably a liquid medium, such as oil. In the systems disclosed in this application, a gaseous operating fluid is employed which, for the purposes of explanation, will be assumed to be air. In the system of FIGS. 1 and 2, variations in the control signal due to temperature changes are achieved by virtue of the fact that the acoustic velocity or velocity of a pressure wave in a gaseous medium varies in proportion to the square root of the absolute temperature of the medium.

Referring first to FIG. 1, a pressure pulse generator designated generally 24 takes the form of a piston 26 which is driven in reciprocation within a cylinder 28 by a cam 30 which is fixedly mounted upon and rotates with a shaft 32 driven by the variable speed device 20. The upper end of piston 26 is movable both above and below inlet ports 34 in the wall of cylinder 28. Piston 26 is shown in FIG. 1 near the upper end of its stroke; at the lower end of its stroke the upper end of the piston is below ports 34 so that air from the atmosphere can flow into the cylinder until the piston is driven upwardly above ports 34, at which time air within the cylinder above the piston is compressed and forced as a pressure pulse through outlet port 36. A delay line 38 which passes through the chamber 22 conducts the pulse from outlet 36 to the inlet of a pulse divider designated generally 40, the delay in 38 being such that a finite time is required for the pulse to travel through the delay line. Because shaft 32 is driven in rotation by the variable speed device 20, pressure pulses are thus fed into the delay line periodically at a frequency which is proportional to the speed of revolution of shaft 32.

Pulse divider 40 includes a housing 42 having a central bore 44 within which a pulse-dividing member 46 is mounted for rotation. Member 46 is driven in rotation from shaft 32 via a suitable coupling mechanism 48 which preferably includes some angular adjustment mechanism by means of which the rotative phase of member 46 relative to that of pulse-generating cam 30 may be initially adjusted. Delay conduit 38 is connected to an inlet port 50 which passes through the wall of housing 42 in axial alignment with a recess having two circumferentially extending portions 52a and 52b (FIG. 2) separated from each other by a narrow dividing lip 54 which extends axially across the recess.

Above and below port 50, annular recesses 56 and 58 are formed in the inner wall of housing 42 to communicate respectively with outlet ports 60 and 62. An axially extending slot 64 extends downwardly from one end of recess 52b to place recess 52b in communication with annular recess 58. A similar slot 66 on the opposite side of member 46 extends upwardly from the end of recess 52a of the dividing member to place recess 52a in communication with annular recess 56. Outlet ports 60 and 62 are connected respectively to conduits 68 and 70 which may, as shown in my U.S. Pat. No. 3,395,718, be connected directly to the opposite ends of a differential pressure control motor such as 72. Preferably, however, conduits 68 and 70 are connected to operate a servosystem schematically illustrated at 74 which acts to amplify a pressure differential between conduits 68 and 70 to provide a stronger input signal to motor 72. Motor 72 is coupled to the speed varying mechanism of the variable speed device 20 to cause device 20 to drive at a speed determined by the position of the piston rod 76 of motor 72. A suitable servosystem such as schematically illustrated at 74 is disclosed and described in greater detail in my copending application, Ser. No. 750,509, filed concurrently herewith.

With the exception of the modification of the control signal by the temperature in chamber 22, the operation of the system described above is similar to that of the system described in my U.S. Pat. No. 3,395,718. Neglecting for the moment variations in temperature, pressure pulses are cyclically fed into delay conduit 38, one pulse being generated during each revolution of shaft 32. The coupling 48 between shaft 32 and the rotary dividing member 46 is such that dividing member 46 also rotates one revolution for each revolution of shaft 32, the rotative phase of member 46 being related to that of pulse generator 24 such that as long as variable speed device 20 rotates at the desired constant speed, the dividing lip 54 is located such in relation to port 50 that the incoming pulse is split equally into two parts, one half going into recess 52a and the other half going into recess 52b with the result that the same pressure exists in conduits 68 and 70 and thus on the opposite sides of the piston of motor 72. Should the variable speed device 20 slow down, as by an increase in load, dividing lip 54 will not have rotated to its prior position in relation to inlet port 50 at the time the pulse arrives but will, assuming clockwise rotation of member 46 as viewed in FIG. 2, be somewhat above its prior position so that a greater portion of the incoming pulse will go into recess 52b and a smaller portion into recess 52a. This would cause the pressure in conduit 70 to be increased relative to that in conduit 68, thus creating a pressure differential which, amplified by the servosystem 74, will drive piston rod 76 upwardly as viewed in FIG. 1, this movement being employed to increase the speed of variable speed device 20.

Upon an increase in speed of the variable speed device above its desired constant speed, dividing lip 54 will have rotated downwardly past the steady state operating position shown in FIG. 2 by the time the pulse arrives, hence a greater portion of the pulse will go into conduit 52a and a lesser portion into recess 52b, this pressure differential being amplified by the servosystem 74 to drive piston rod 76 downwardly to slow variable speed device 20.

The foregoing description of the system of FIG. 1 has assumed that the temperature in chamber 22 remains constant. As previously stated, the pressure pulses are in a gaseous medium and in most cases propagate at the acoustic velocity of the gas which in turn increases with the square root of the absolute temperature of the gas. Although it is realized that this relationship does not hold true under all circumstances it will be nevertheless exclusively used in the following for the purpose of illustration.

Returning to FIG. 1, a relatively long length of delay conduit 38 is exposed to the temperature existing within chamber 22 and hence the velocity of the pulse through delay line 38 will be increased with an increase in temperature in chamber 22 or decreased in response to a decrease in the temperature within chamber 22.

Should the temperature within chamber 22 increase, the increased velocity of the pulse causes the pulse to arrive at the pulse divider sooner than it would normally, hence the rotating dividing lip 54 will be somewhat short of its previous position at the time of arrival of the pulse and a greater portion of the pulse will go into recess 52b. The net effect of this signal is the same as that represented by a decrease in speed of the variable speed device, hence the correction applied by an increase in temperature acts to increase the speed of the variable speed device 20. In the case where the device 20 is a blower motor, this will cause the motor to drive faster to supply an increased amount of air to space 22 to compensate for the increased temperature. A decrease in temperature in space 22 will result in a reduction in the velocity of the pulse through delay line 38, and will result in the speed of motor 70 being decreased.

Figure 3:
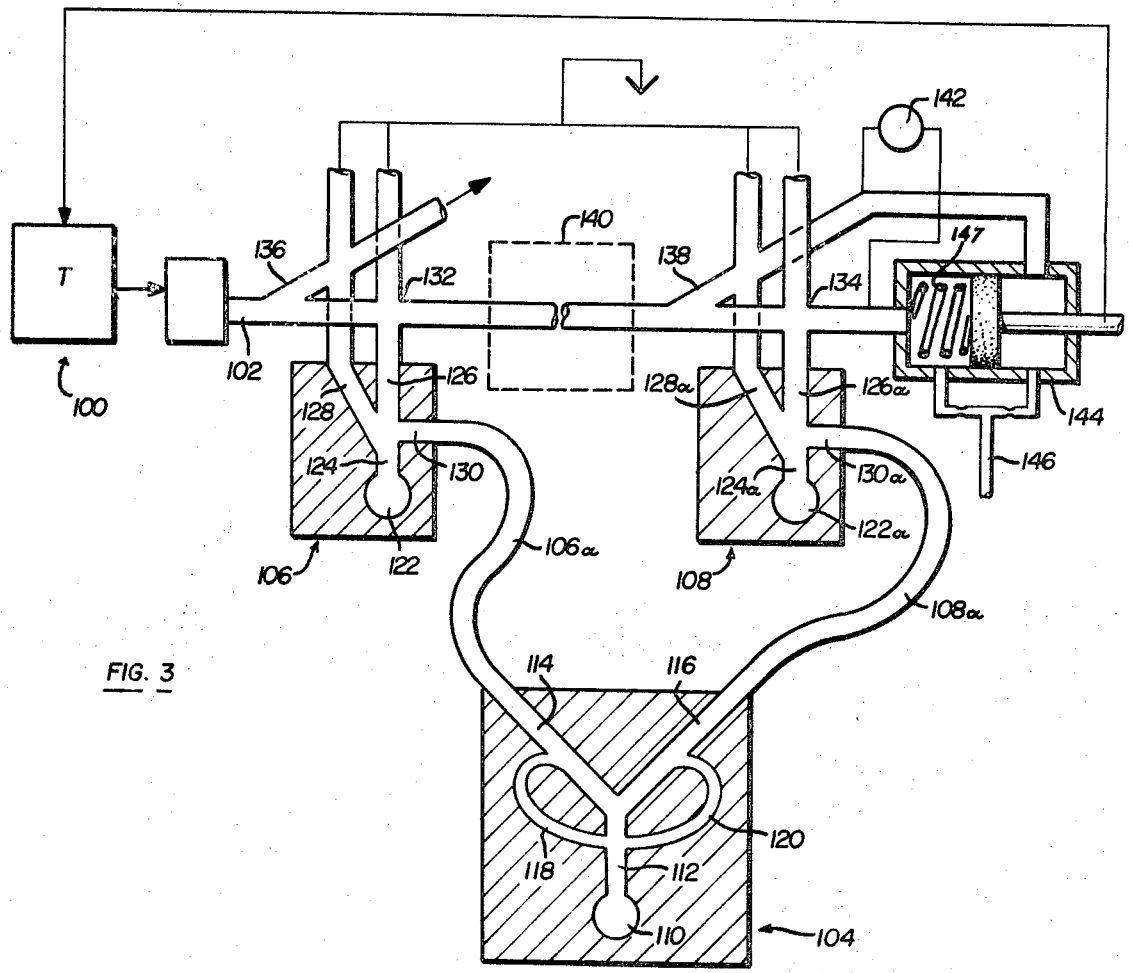
FIG. 3 is a schematic diagram of a fluidic temperature-sensing control system embodying the present invention.

In the system of FIG. 1, a temperature variation was converted into a pressure signal by a mechanical system which included a pulse generator 24 and a pulse divider 40. In FIG. 3 a system is disclosed wherein fluidic elements are employed to enable the control of a variable speed device, such as a turbine, in accordance with a temperature variation of some operating characteristics of the turbine, such as its compressor outlet gas temperature.

In FIG. 3, the turbine is schematically illustrated at 100. A conduit 102 is connected to a source of pressurized gas.

The pulse-generating and dividing means of the system of FIG. 3 are constituted by a fluidic system which includes a bistable fluidic oscillator designated generally 104 and two similar monostable fluidic amplifiers designated generally 106 and 108. Elements 104, 106, and 108, are per se, well known and conventional in the art of fluidics and hence are shown only schematically and will be described briefly.

Bistable oscillator 104 has a pressure source 110 into which a gaseous fluid, such as air, is fed under constant pressure. The air flows from source 110 through a main conduit 112 and from conduit 112 into either one of a pair of branch conduits 114 or 116. The configuration of the flow path is such that essentially, due to the Coanda effect, all of the air flowing through conduit 112 passes into one or the other of conduits 114, 116.

Assuming all of the air passing through conduit 112 is flowing into branch passage 114, a portion of the air flowing through passage 114 is returned by feedback passage 118 which, upon discharge into conduit 112 flips the air jet to the right into conduit 116. As soon as this occurs, a portion of the air flowing through conduit 116 is returned via feedback passage 120 to flip the airflow back into conduit 114, this process repeating itself ad infinitum. The device 104 thus functions to discharge air in pressure pulses alternately from conduits 114 and 116.

Each of the monostable fluidic amplifiers 106 and 108 operates in precisely the same fashion, hence only amplifier 106 will be described. Amplifier 106 includes a pressure source 122 which, like pressure source 110, is continuously supplied with a constant flow of air which normally will flow from main passage 124 into an aligned outlet passage 126, this flow constituting the stable condition of the monostable element. Main passage 124 also communicates with a branch outlet passage 128 which branches at an angle from passage 124. A control passage 130 communicates with main passage 124 and upon the supply of airflow through control passage 130, the airflow from passage 124 will be deflected into passage 128, as long as the flow of air is maintained at control passage 130. A relatively small airflow applied at control passage 130 can deflect a much larger flow of air through passage 124, thus amplifying the control signal applied to passage 130.

Corresponding reference numerals with the suffix a have been applied to monostable amplifier 108. The control ports 130, 130a of the two amplifiers are respectively connected to the outlet conduits 114, 116 of the bistable oscillator 104 by conduits 106a, 108a.

From the foregoing description of the bistable fluidic oscillator 104, it is believed apparent the control jets are supplied alternately by the oscillator to control ports 130 and 130a so that if conduits 106a and 108a are of equal length, during the period of time while fluid is flowing through passage 126 of amplifier 106 in the absence of a control jet at passage 130, a control jet is being applied at passage 130a of amplifier 106 and hence the output flow of amplifier 108 is, at this time, through conduit 128a. When the oscillator shifts, the output flow of amplifier 108 will be through conduit 126a, while at amplifier 106 a control jet will be present at conduit 130 so that the outlet of amplifier 106 will be via conduit 128.

Outlet conduits 126 and 126a of the two fluidic amplifiers intercept conduit 102 at space points 132 and 134, the section of conduit 102 between these two points corresponding to the delay line of the previously described embodiment and the delay line of the system of my copending application, Ser. No. 536,400. Immediately upstream from each of points 132 and 134, branch conduits 136 and 138 branch from conduit 102 and each of these branch conduits is in turn intercepted by the outlet conduit 128 and 128a respectively of the two fluidic amplifiers.

The outlet flow of the fluidic amplifiers is substantially greater than the flow through conduit 102 so that when the outlet flow of amplifier 106, for example, is directed through passage 126, it flows directly through and across conduit 102 and has the effect of blocking flow of fluid through conduit 102 past the intersection 132. This requires all of the flow in conduit 102 to go through branch 136 as long as the fluidic amplifier output flows through passage 126. Upon reversal of the state of fluidic amplifier 106, its outlet is via passage 128 and this similarly has the net effect of closing branch passage 136.

During passage of the gaseous fluid through conduit 102 between intersections 132 and 134, the velocity of the pressure pulses between points 132 and 134 in delay conduit 102 will increase or decrease in accordance with changes in the temperature of the gas in said delay conduit.

Operation of the FIG. 3 embodiment is as follows. To analogize the FIG. 3 system to the system disclosed in my U.S. Pat. No. 3,395,718, fluid amplifier 106 acts as a pulse "generator" while fluid amplifier 108 acts as a pulse divider. Fluid is supplied at constant pressure to the left-hand end of conduit 102 and conduit 102 is alternately opened or closed by the action of the output of the fluidic oscillator 104 at control port 130 of fluidic amplifier 106. Thus, pressure pulses are intermittently released at intersection 132 to move to the right through conduit 102 to intersection 134. The time required for the pulse to travel from intersection 132 to intersection 134 will depend upon the velocity of the pulse through this section of conduit 102 and this velocity in turn is dependent upon the temperature of the gas in conduit 102. Thus, when the pulse arrives at intersection 132, a portion of the pulse may pass beyond point 134, this portion being dependent upon the phase of operation of fluidic amplifier 108 at the time the pulse arrives at intersection 132.

That portion of the pulse which cannot pass beyond intersection 134 passes into branch conduit 138, and hence the pulse is divided in accordance with the particular phase state of amplifier 108 at the time of arrival of the pulse. Thus the pressure differential which exists between branch conduit 138 and that portion of conduit 102 downstream from intersection 134 represents a pressure signal related to the temperature of the gas in line 102. This temperature may, if desired, be indicated upon a differential pressure gauge 142 connected across the two conduits as shown in FIG. 3. Conduit 102 and branch conduit 138 may be connected to opposite sides of the piston of a differential pressure motor 144 whose stroke may be employed to exert a control function upon the turbine, as for example, to control the turbine fuel supply. The opposite sides of differential motor 144 are preferably provided with a controlled venting means 146 to prevent undue pressure buildup on opposite sides of the motor. Likewise the pressure signal thus generated could be modified in a fluidic circuit and the output used for control purposes or temperature indication.

In FIG. 3, the control system therein disclosed is responsive solely to temperature, the frequency at which the pulses are "generated" being a fixed frequency determined by the characteristics of the fluidic elements and their transmission lines. In the system disclosed, the length of conduit 102 between intersections 132 and 134 would be chosen to be such that when the gas is at a known temperature, the pulse would arrive at intersection 134 at a time such that a known pressure differential will develop at the motor 144 and thus the piston of the motor 144 will assume a known position against the action of spring 147.

The phase relationship controlling the effect of the fluidic elements at intersections 132 and 134 can be adjusted in several ways.

First, the length of the conduit 108a connecting oscillator outlet 116 to control port 130a of amplifier 108 may be related to the length of the corresponding conduit 106a connecting outlet 114 to control port 130 of amplifier 106. If these two conduits are of the same length, intersection 132 will be blocked essentially during the same period of time that intersection 134 is open and vice versa. If one of the two conduits is longer than the other, a shift in time between the opening and closing periods can be achieved in dependence upon the relative length of the conduits to each other since it will require a longer period of time for the control pulse from the oscillator to arrive at its control conduit if it must traverse a longer path than the control pulse to the other amplifier.

The switching time of the oscillator itself can be selected by making a section of passages 118 and 120 extend externally of the device and employing conduits of selected length for the external sections.

Figure 4:
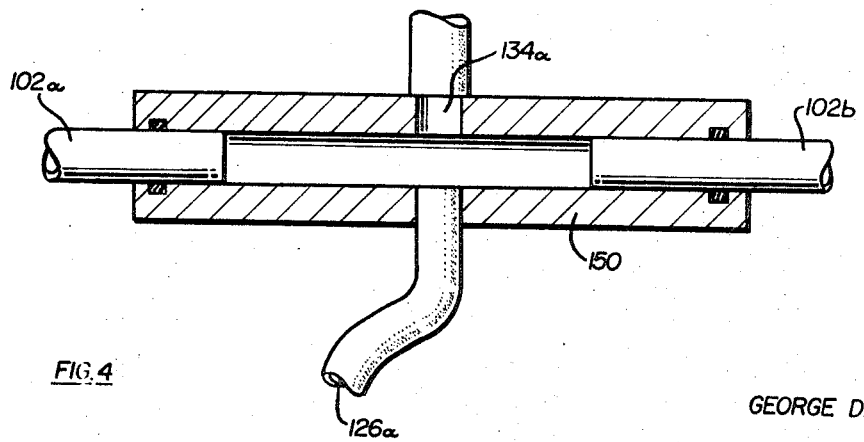
FIG. 4 is a cross-sectional view of an element for adjusting the length of a delay line.

Alternatively, the length of conduit 102 between points 132 and 134 may be made adjustable for connecting passage 126a of amplifier 108 to a sleeve 150 slidably mounted to connect two spaced sections 102a and 102b of conduit 102, as shown in FIG. 4. By shifting sleeve 150 to the left or right as viewed in FIG. 4, the intersection 134a can be moved toward or away from intersection 132 to effectively increase or decrease the length of the delay line section of conduit 102.

Figure 5:
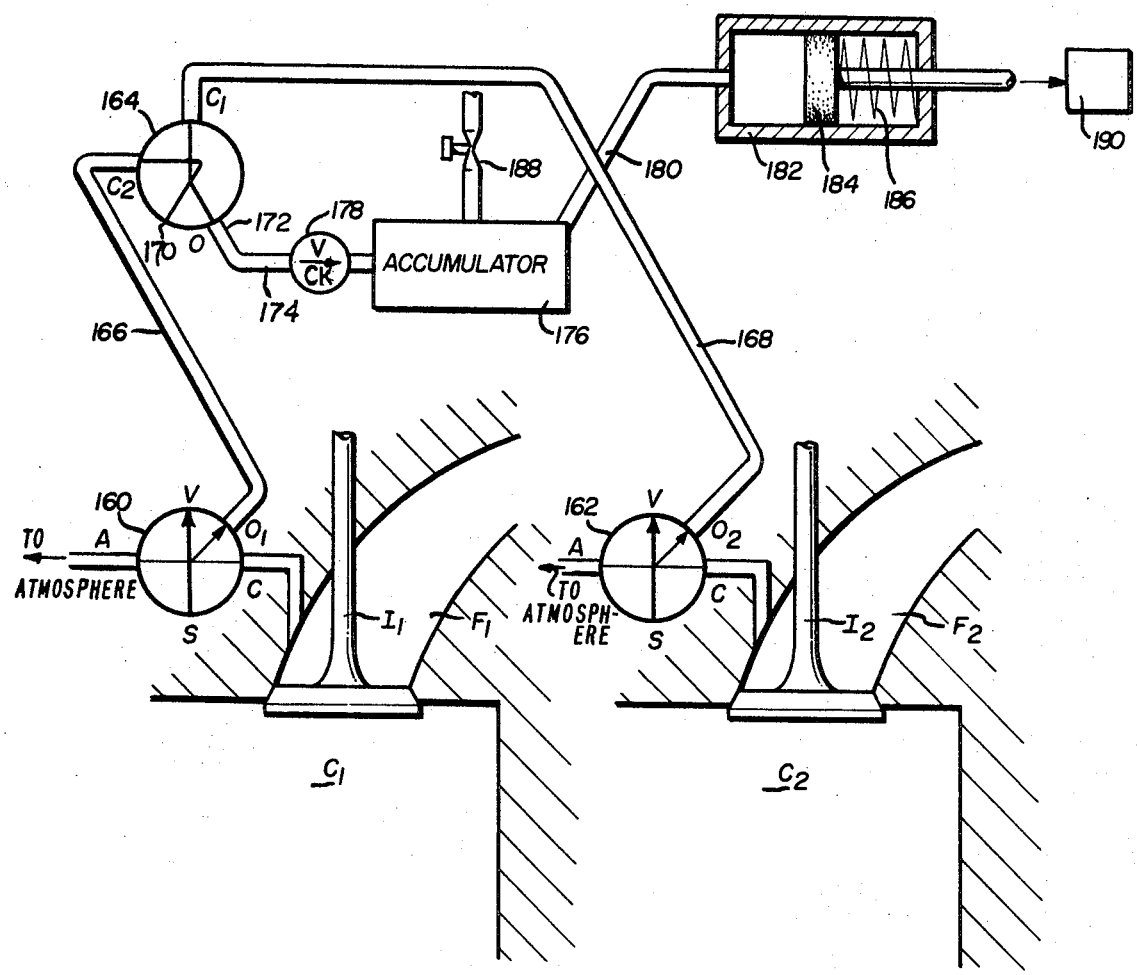
FIG. 5 is a schematic diagram of another form of control system.

In FIG. 5 there is disclosed a fluidic speed-sensing system in which a speed control for an internal combustion engine operable in the manner of the system of my U.S. Pat. No. 3,395,718 can be achieved fluidically. In the diagram of FIG. 5, the spaces $C_1$ and $C_2$ respectively designate the interior of two separate cylinders of an internal combustion engine while the reference numerals $I_1$ and $I_2$ designate the air inlet valves which control the flow of air from the air intake passages $F_1$ and $F_2$ into the respective cylinders for combustion. As is well known, intake valves $I_1$ and $I_2$ are open during only a portion of the cycle of operation, and during this portion of the cycle, the intake passages $F_1$ and $F_2$ drop below atmospheric pressure due to the air velocity in the intake passages. This negative pressure is employed to actuate the control jet of a fluidic amplifier similar in function to the amplifiers 106 and 108 previously described.

The fluidic amplifiers schematically indicated at 160 and 162 of FIG. 5 differ from the amplifier 106 of FIG. 3 solely in that a passage A opening to atmosphere intercepts the main passage of the monostable amplifier directly opposite the control connection C. The passage A corresponds to the passage 130 of amplifier 106, and the pressure in it is balanced by the pressure in conduit C except when this pressure is decreased as described above and a negative pressure is exerted at port C. This negative pressure exists only while the intake valve $I_1$ or $I_2$ connected to the particular control port C is open, the pressure at ports C being essentially atmospheric during that period of time when the associated intake valve is in its closed position. Thus, normally the fluidic amplifiers 160 and 162 of FIG. 5 are in a stable condition wherein the flow from the supply S is vented through port V. When a negative pressure is applied at the control port C the pressure differential across the jet in the amplifier causes the flow of the amplifier to switch to the port $0_1, 0_2$ respectively.

Thus, a pressure pulse will be generated at outlet $0_1$ of amplifier 160 during the period of time its associated intake valve $I_1$ is open, and similarly a pressure pulse will be generated at outlet $O_2$ of amplifier 162 during that period of time its associated intake valve $I_2$ is open. Outlet port $O_1$ of amplifier 160 is connected to a control port $C_2$ of an AND fluidic element 164 by a conduit 166. Outlet port $O_2$ of amplifier 162 is connected via a conduit 168 to a second control port $C_1$ of AND element 164.

AND element 164 of FIG. 5 may take the form of a conventional commercially available fluidic element, such as the AND element sold by General Electric Company as Model DA-32 and described in a General Electric publication entitled "General Electric Fluidic Products."

AND element 164 is provided with two outlets 170 and 172 which are connected within the element in a manner such that if an input is applied to only one of control ports $C_1$ or $C_2$, the output will be through outlet 170. If inputs are applied simultaneously to both control ports $C_1$ and $C_2$, the combined output will be from outlet port 172.

Outlet 170 is vented, while outlet 172 is connected via a conduit 174 to an accumulator 176. A one-way check valve 178 in conduit 174 prevents reverse flow from the accumulator back to the AND element. The accumulator is in turn connected via a conduit 180 to a fluid pressure motor 182 whose piston 184 is biased by a spring 186 against the pressure supplied to the motor from accumulator 176. The accumulator is provided with an adjustable venting orifice 188 which may be employed to adjust the speed setting of the engine, the speed control of the engine being operated by piston 184 as schematically indicated at 190.

Operation of the FIG. 5 system is as follows. The opening and closing of the two intakes valves $I_1$ and $I_2$ of two different cylinders of an internal combustion engine will occur at fixed angular positions of the rotating engine shaft. The angle between these two fixed positions remains unvarying, however, the time required for the shaft to rotate through this angle will vary with the speed of the engine. Thus, assuming the intake valve $V_1$ opens at a time in advance of the opening of intake valve $I_2$, a pressure pulse will be transmitted from fluid amplifier 160 at a point in time before a similar pulse is transmitted from amplifier 162. Should the engine speed up, the time between the transmission of a pulse from amplifier 160 and the transmission of a pulse from amplifier 162 will be reduced, should the engine slow down, the time between transmission of pulses from the respective amplifiers will be increased.

It should be noted that the time of duration of the pulses- —i.e. pulse "length"—will vary inversely with the speed of the engine since the period of time that the associated intake valve is open will correspondingly increase or decrease inversely with the engine speed. However, this latter action is applied equally at the two amplifiers 160 and 162.

The relative length of conduits 166 and 168 are chosen such that at the normal operating speed of the engine, the pulses will arrive at control ports $C_1$ and $C_2$ out of phase with each other in a fashion such that approximately one-half of each pulse overlaps the other. Thus, under normal operating conditions, the overlapped pulse portions will be transmitted to the accumulator from outlet port 172 of the AND element while both of the nonoverlapped portions will be vented at port 170. Assuming that the length of conduits 166 and 168 is such that the pulse from amplifier 160 is first transmitted and first to arrive at control port $C_2$, a speeding up of the engine will reduce the time interval between the transmission of pulses from amplifiers 160 and 162 and thus increase the degree of overlapping of the pulses, hence increasing the output of AND element 164 through conduit 172. This in turn will build up pressure in the accumulator causing piston 184 to move to the right to apply a speed-decreasing action to the engine control. Conversely, should the engine slow down, a greater time period will elapse between the transmission of pulses from amplifiers 160 and 162, hence decreasing the amount of overlap to exert an opposite control effect.

To reverse the controlling action, the length of conduits 166 and 168 may be chosen such that the first transmitted pulse from amplifier 160 travels through a conduit of a length such that it does not arrive at AND element 164 until after the arrival of the corresponding pulse from amplifier 162. In this situation, an increase in engine speed would decrease the degree of overlap in the time of arrival of the respective pulses, causing a reduced pressure output from the AND element.

To analogize the fluidic system of FIG. 5 to the mechanical systems of my U.S. Pat. No. 3,395,718, one of the two amplifiers 160 or 162 may be considered to be the pulse generator, while the other amplifier combined with the AND element constitutes the pulse-dividing means. The "delay line" would be in the length of the passages connecting the amplifiers to the AND element.

It is believed apparent that a temperature-responsive control function could be added to the system of FIG. 5 by placing one of the two passages 166 or 168 in a thermally exposed relationship to a heated portion of the engine system, such as the exhaust manifold, to cause a time variation in the time of transit of the pulse from the amplifier to the AND element in response to variations in temperature.

While various embodiments of the invention have been described in detail, it will be apparent to those skilled in the art that the various embodiments are capable of a wide variety of modification as to the arrangement, disposition and form of the parts and/or combination of the basic elements without departing from the principals of the present invention. Therefore, the foregoing description is to be considered examplary rather than limiting, and the true scope of the invention is that defined in the following claims.

I claim:

1. For use in combination with a variable speed device having pressure-responsive control means for varying the speed of said device in accordance with a pressure signal transmitted thereto; means for generating a pressure signal variable in accordance with an operating condition of said device comprising pressure pulse-generating means for periodically transmitting gaseous fluid pressure pulses, pressure pulse-dividing means having pulse-receiving means and a pair of outlet conduits, cyclically operable dividing means in said pulse-dividing means operable to divide pulses received by said receiving means between said outlet conduits in proportions determined by the phase of said cyclically operable dividing means within its cycle at the time of arrival of a pulse at said pulse-receiving means, delay line means for transmitting pulses from said generating means to said pulse-receiving means with a finite time delay, means responsive to said operating condition of said variable speed device for varying the relationship between the phase of the cyclically operable dividing means and the time of arrival of a pulse at said pulse-receiving means in accordance with variations in said operating condition, and means coupling at least one of said outlet conduits to said pressure-responsive control means to transmit those portions of the divided pulses to said pressure-responsive means to constitute said pressure signal.

2. The invention defined in claim 1 wherein said operating condition is the temperature within a selected region, which temperature is variable in accordance with the speed of said variable speed device, said means responsive to said operating condition comprising means thermally exposing said delay line means to said selected region to cause the temperature of the gaseous fluid within said delay line means to vary in accordance with variations in temperature in said selected region whereby the velocity of said pulses through said delay line means is varied in response to variations in temperature of said selected region.

3. The invention defined in claim 2 further comprising means for operating said cyclically operable dividing means and said pressure pulse-generating means at the same operating frequency whereby one pulse is transmitted from said pulse-generating means during each cycle of operation of said cyclically operable dividing means.

4. The invention as defined in claim 3 wherein said means for operating comprises means driven by said variable speed device whereby said operating frequency is proportional to the speed of said variable speed device.

5. The invention defined in claim 1 wherein said pulse-generating means comprises first fluidic amplifier means and said pulse-dividing means comprises second fluidic amplifier means, each of said amplifier means having a fluid source, a pair of outlet conduits and control port means operable upon the application of a first fluid signal to direct the flow of fluid from said fluid source into one of said pair of outlet conduits and operable in response to a second fluid signal to direct the flow of fluid from said fluid source to the other of said outlet conduits, and means for periodically applying a first fluid signal to the control port of each of said fluidic amplifier means.

6. The invention of claim 5 wherein said means for periodically applying a fluid signal comprises means driven by said variable speed device at a cyclic rate proportional to the speed of said variable speed device.

7. The invention of claim 6 wherein said pulse dividing means further comprises fluidic AND element means having a pair of inlet ports, a pair of outlet ports, means operable when fluid flows simultaneously into both of said inlet ports to direct the combined fluid flow to one of said outlet ports and operable upon flow of fluid only into either one of said inlet ports to direct the flow to the other of said outlet ports, said inlet ports of said AND element means being respectively connected to one outlet conduit of each of said amplifier means, and means connecting said one of said outlet ports to said pressure-responsive control means.

8. The invention defined in claim 5 wherein said means for periodically applying a fluid signal comprises bistable fluidic oscillator means having a pair of output conduits and means for alternately discharging a fluid pulse into said output conduits, said output conduits being respectively connected to the control ports of said amplifier means.

9. The method of controlling the operation of a variable speed device in accordance with variations in an operating conditions by means of a pressure-responsive control means comprising the steps of periodically transmitting gaseous fluid pressure pulses to a pulse-receiving station through a first conduit of an effective length such that a finite time interval is required for a pulse to travel through the conduit, cyclically operating a pulse-dividing means at said pulse-receiving station to divide incoming pulses between a pair of outlet conduits in proportions determined by the phase of the dividing means within its cycle of operation at the time of arrival of the pulse at the receiving station, varying the relationship between the phase of said dividing means and the time of arrival of the pulse in accordance with variations in an operating condition of said variable speed device, and connecting one of said outlet conduits to said pressure-responsive control means.

10. The method defined in claim 9 wherein the step of varying the relationship between the phase of the dividing means and time of arrival of the pulse comprises the step of exposing a portion of said first conduit to the temperature of a selected region to cause the temperature of gaseous fluid within said first conduit to vary in accordance with variations in temperature within said selected region.

11. The method defined in claim 10 further comprising the step of cyclically operating said dividing means at the same operating frequency as pulses are transmitted from said first location.

12. The method of claim 11 further comprising the step of maintaining said operating frequency is a fixed proportional relationship to the speed of said variable speed device.

13. The method of claim 11 further comprising the step of maintaining said operating frequency constant throughout changes in speed of said variable speed device.

14. The method of claim 9 wherein the step of cyclically operating a pulse-dividing means comprises the steps of periodically transmitting gaseous pressure fluid pulses to said receiving station through a second conduit of a length such that a finite time interval is required for a pulse to travel through the conduit, transmitting that portion of pulses arriving simultaneously through both conduits at said receiving station through one of said outlet conduits and transmitting the remaining portions of the arriving pulses through the other of said outlet conduits.

15. The method of generating a pressure signal variable in accordance with the speed of a variable speed device having more than one operating cycle comprising the steps of generating a series of pressure pulses of substantially equal amplitude during a selected fixed portion of each of two out-of-phase operating cycles of the variable speed device whereby the pulses of the two series are of the same frequency and are out of phase with each other, transmitting each series of pulses separately to a comparing station while maintaining the amplitude of both series of pulses substantially constant, and combining at said station those portions of the pulses of the two series which arrive at said station simultaneously and separating the combined pulse portions from the remaining portions of the arriving pulses to thereby produce a pressure signal variable with variations in the time interval between the generation of corresponding out of phase pulses of the respective series.

16. In a multicylinder internal combustion engine, a speed-sensing system for generating a fluid pressure signal variable in accordance with variations in the speed of the engine comprising a pair of similar pulse-generating means respectively associated with each of two out-of-phase cylinders of said engine for generating a series of pressure pulses at a frequency proportional to the speed of said engine, said generating means being operable to generate a pulse during a selected portion only of the operating cycle of the associated cylinder, a fluidic AND element, separate conduit means for transmitting pulses from the respective generating means to said AND element, said AND element having a pair of outlet conduits and being operable to combine those pulse portions arriving at said AND element simultaneously from said separate conduit means and to transmit the combined pulse portions through one of said outlet conduits and to transmit the remaining pulse portions through the other of said outlet conduits.